(12) United States Patent
Pilarz

(10) Patent No.: US 10,977,680 B2
(45) Date of Patent: Apr. 13, 2021

(54) GEO-LOCALIZATION PURCHASE INCENTIVE SYSTEM

(71) Applicant: Marcin Pilarz, Warsaw (PL)

(72) Inventor: Marcin Pilarz, Warsaw (PL)

(73) Assignee: TALKIN THINGS SP . Z O.O., Warsaw (PL)

( * ) Notice: Subject to any disclaimer, the term of this patent is extended or adjusted under 35 U.S.C. 154(b) by 288 days.

(21) Appl. No.: 15/811,567

(22) Filed: Nov. 13, 2017

(65) Prior Publication Data

US 2018/0137533 A1    May 17, 2018

Related U.S. Application Data

(60) Provisional application No. 62/421,330, filed on Nov. 13, 2016.

(51) Int. Cl.
| | |
|---|---|
| *G06Q 30/02* | (2012.01) |
| *G06K 19/07* | (2006.01) |
| *G06K 19/077* | (2006.01) |
| *G01S 19/13* | (2010.01) |
| *H04W 4/80* | (2018.01) |

(52) U.S. Cl.
CPC ..... *G06Q 30/0233* (2013.01); *G06K 19/0723* (2013.01); *G06K 19/07709* (2013.01); *G06K 19/07798* (2013.01); *G01S 19/13* (2013.01); *G06K 19/0776* (2013.01); *H04W 4/80* (2018.02)

(58) Field of Classification Search
CPC ............... G06Q 30/02; G06Q 30/0233; G06K 19/0723; G06K 19/07709; G06K 19/07798; G06K 19/0776; H04W 4/80; G01S 19/13
See application file for complete search history.

(56) References Cited

U.S. PATENT DOCUMENTS

| | | | |
|---|---|---|---|
| 8,099,109 B2 * | 1/2012 | Altman | G06Q 30/0207 455/456.3 |
| 8,670,786 B2 * | 3/2014 | Crowley | H04M 3/42 455/456.3 |
| 8,832,301 B2 * | 9/2014 | Graff | G06Q 10/1093 709/231 |
| 9,536,404 B2 | 1/2017 | Glamuzina | |
| 2008/0306826 A1 * | 12/2008 | Kramer | G06Q 30/02 705/14.14 |
| 2012/0218084 A1 * | 8/2012 | Arponen | G06Q 20/322 340/10.5 |
| 2014/0236726 A1 * | 8/2014 | Acosta | G06O 30/0261 705/14.58 |
| 2017/0032382 A1 * | 2/2017 | Shulman | G06Q 30/06 |

\* cited by examiner

*Primary Examiner* — Thuy N Nguyen
(74) *Attorney, Agent, or Firm* — Seth Natter; Natter & Natter

(57) ABSTRACT

A geo-localization purchase incentive system employs product label with imbedded NFC tags. The label is adhered to a product package and seal the package opening. Prior to purchase the tag is accessed with an NFC enabled device to retrieve product specific information. Upon opening the product package after purchase, a circuit loop in the tag is broken and the purchaser's NFC enabled device receives an invitation to a social event wherein brand loyalty is promoted. The event, social media interaction with other loyalty purchasers is enabled through geo-localization.

19 Claims, 10 Drawing Sheets

GEO-LOCALIZATION PURCHASE INCENTIVE SYSTEM

RELATED APPLICATIONS

This application claims the benefit of provisional Application No. 62/421,330 filed Nov. 13, 2016, the disclosure of which is incorporated herein by reference in its entirety.

BACKGROUND OF THE INVENTION

Field of the Invention

The present invention relates generally to retail merchandising and more specifically to a system for customer access to product data and purchase loyalty incentives, including social events with interaction between purchasers.

Antecedents of the Invention

Customer brand loyalty programs have involved offering benefits to customers who make repeated purchases. Reward benefits have included discounts on future purchases, free merchandise, etc. Rewards were generally obtained upon making purchases at brick and mortar retail establishments as well as when online purchases were made. Additional loyalty purchase incentives were lacking, however. Social interaction with other purchasers of the same brand was available only through online social media. With respect to alcoholic beverages, lounges and bars have comprised the dominant medium for live face to face social interaction between consumers, however such gatherings did not foster loyalty to a particular brand.

There existed a need for implementing a brand loyalty program wherein loyalty rewards were obtained by merely opening a package of branded product as well as a brand loyalty program wherein loyal customers are directed to an event for social interaction.

SUMMARY OF THE INVENTION

The invention utilizes labels having tags based on NFC technology. The labels are adhered to a product package and seal the package opening. When a prospective purchaser accesses the tag with a smartphone or other NFC enabled device, product specific information, such as available incentive rewards is accessible. When the product package is opened after purchase, a loop in the tag is broken and the purchaser gains access, through the NFC enabled device, to brand loyalty rewards, e.g., loyalty points added to their accounts, discount codes, etc., as well as invitations to special event locations wherein brand loyalty is promoted. At the events, social media interaction with other loyalty purchasers is enabled through geo-localization.

From the foregoing compendium, it will be appreciated that an aspect of the present invention is to provide a geo-localization purchase incentive system of the general character described which is not subject to the foregoing disadvantages of the antecedents of the invention.

A feature of the present invention is to provide a geo-localization purchase incentive system of the general character described which is easy to use.

A consideration of the present invention is to provide a geo-localization purchase incentive system of the general character described which promotes brand loyalty.

Another aspect of the present invention is to provide a geo-localization purchase incentive system of the general character described which generates brand loyalty rewards to an NFC enabled hand carried smart device upon opening a package containing the branded goods.

An additional feature of the present invention is to provide a geo-localization purchase incentive system of the general character described wherein tags affixed to products are accessed by prospective customers through an NFC enabled hand carried smart device to retrieve product specific data.

A further consideration of the present invention is to provide a geo-localization purchase incentive system of the general character described wherein purchasers are directed to special event locations promoting brand loyalty.

To provide a geo-localization purchase incentive system of the general character described wherein which generates brand loyalty rewards when purchasers access an NFC tag affixed to a product at a special event location.

A still further feature of the present invention is to provide a geo-localization purchase incentive system of the general character described wherein NFC tags affixed to product packages enable hand carried smart devices to retrieve loyalty rewards after the package is opened.

Other aspects, features and considerations of the present invention in part will be obvious and in part will be pointed out hereinafter.

With these ends in view, the invention finds embodiment in various combinations of elements, arrangements of parts and series of steps by which the above-mentioned aspects, features and considerations and certain other aspects, features and considerations are attained, or with reference to the accompanying drawings and the scope of which will be more particularly pointed out and indicated in the appended claims.

BRIEF DESCRIPTION OF THE DRAWINGS

In the accompanying drawings, wherein some of the various possible exemplary embodiments of the invention are shown.

DESCRIPTION OF THE PREFERRED EMBODIMENT

Figure 1:
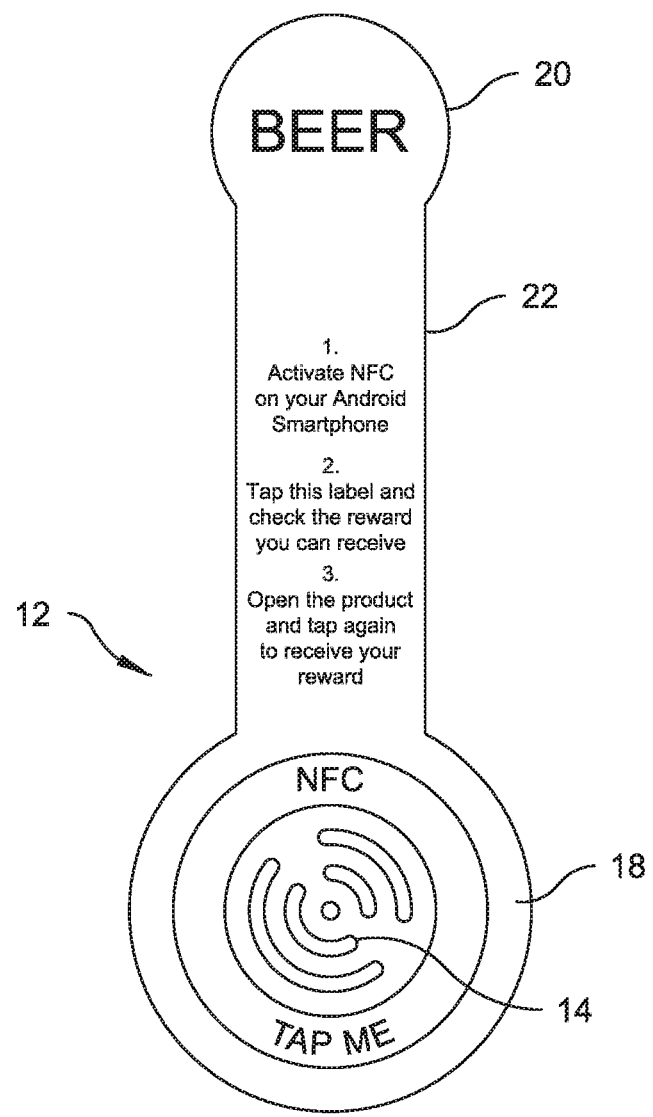
FIG. 1 is a plan view of a product label having an embedded NFC tag in accordance with the invention, the label having a base and a neck with a package closure seal at its distal end.
Figure 2:
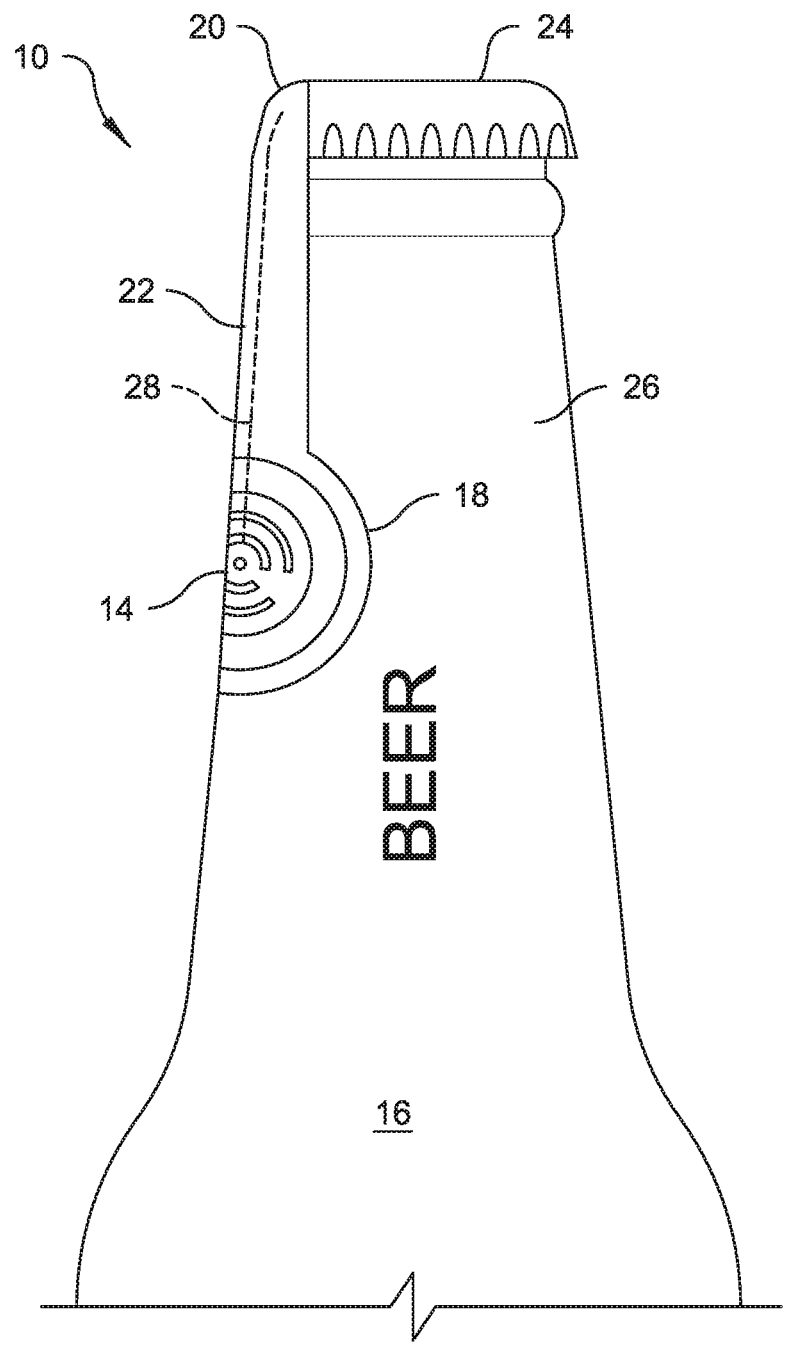
FIG. 2 is a fragmentary elevation view of a product package comprising a beer bottle with the label and tag adhered thereto and with the closure seal engaging a bottle cap.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein.

Moreover, applicant dos not intend for any term in the specification or claims to be ascribed an uncommon or special meaning unless explicitly set forth as such. Further, the present invention encompasses present and future known equivalents to the known components referred to herein by way of illustration.

Referring now in detail to the drawings, the reference numeral 10 denotes generally a purchase incentive system of the present invention. In accordance with the invention a label 12 carries an RFID tag 14 which functions on HF-NFC (near field communication) frequencies embedded therein. The tag 14 is programmed by a host with an electronic product code (EPC) which may include a unique series number, product specifications and promotional codes, with associated data being suitably stored, e.g. in a cloud based system.

The label 12 and tag 14 are affixed to a product container, e.g. a beer bottle 16, prior to or upon delivery to a retail store. The label 12 includes a base portion 18, which overlies the tag 14. A package closure seal portion 20 is joined to the base portion 18 by a collar 22. By way of example, the seal portion 20 is adhered to a package closure comprising a bottle cap 24 and the collar 22 is adhered to a bottle neck 26. A frangible circuit loop 28 extends from the tag 14 to the seal portion 20. An intact frangible loop 24 indicates that the bottle 16 has not been opened.

At the store, the tag 14 and can be tapped and read by a prospective purchaser's NFC enabled smart device, such as a smartphone 30, which is provided with an app for reading the tag 14. As employed hereinafter, the term "smartphone" is to be construed as any NFC enabled portable device having GPS functionality. The smartphone 30 communicates with the host database through a Wi-Fi network, a mobile network, e.g. LTE, etc., for retrieval of product specific information, e.g., caloric content, price, available promotions, rewards points to be credited upon purchase, etc.

Figure 3:
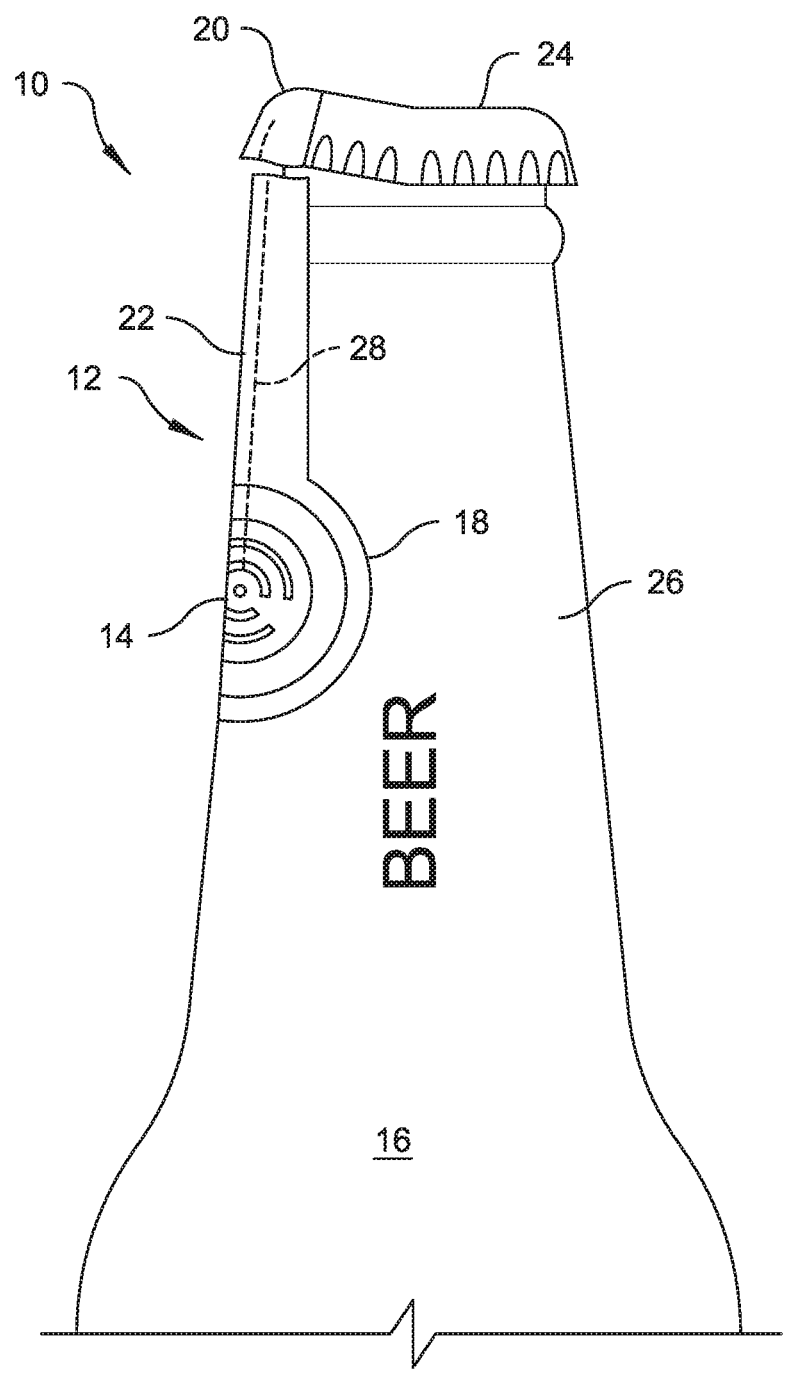
FIG. 3 is a fragmentary elevation view of the product package, similar to FIG. 2, with the bottle cap opened and the seal together with an integral NFC internal loop circuit broken.
Figure 4:
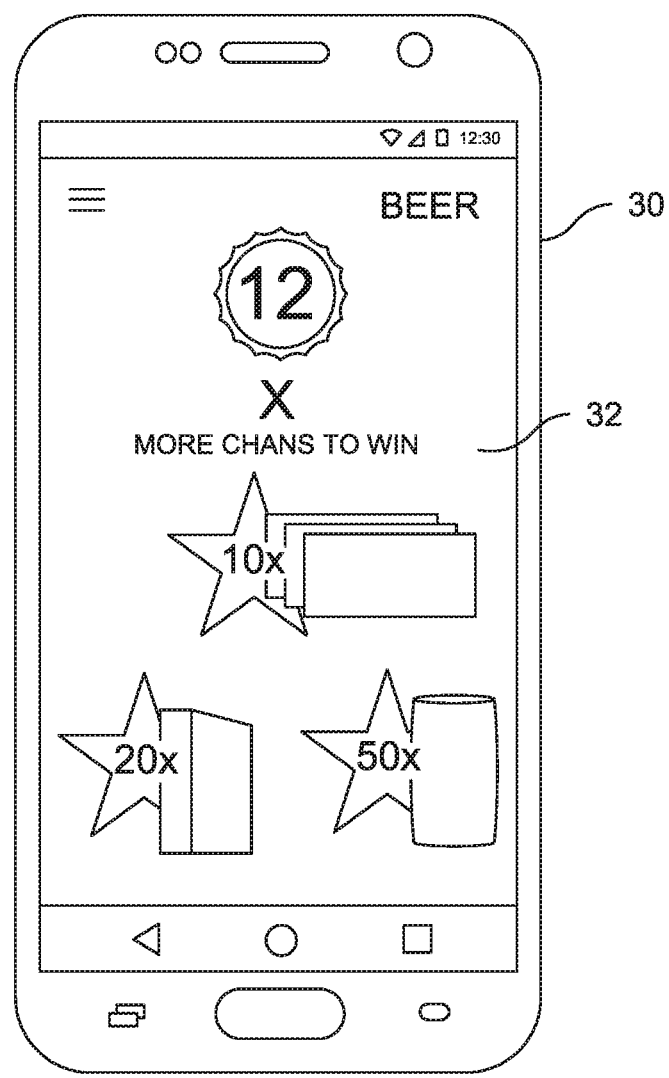
FIG. 4 is a plan view of an NFC enabled device in accordance with the invention having a screen displaying available loyalty prizes after the loop has been broken.

With reference to FIG. 3, after the bottle of beer 16 has been purchased the frangible circuit loop 28 is broken upon opening the bottle cap 24. Proof of purchase and loyalty marketing features are then activated and available on the purchaser's smartphone 30. The loyalty purchaser can then access the tag 14 with the smartphone 30 for post purchase functions and the smartphone 30 communicates with the host database through a Wi-Fi network, a mobile network, e.g. LTE, etc., to input and download data for obtaining merchant or manufacturer loyalty reward points, lottery participation, etc., on the smartphone screen 32, as illustrated in FIG. 4. The loyalty purchaser's smartphone GPS location is retrieved and monitored by the host.

Figure 5:
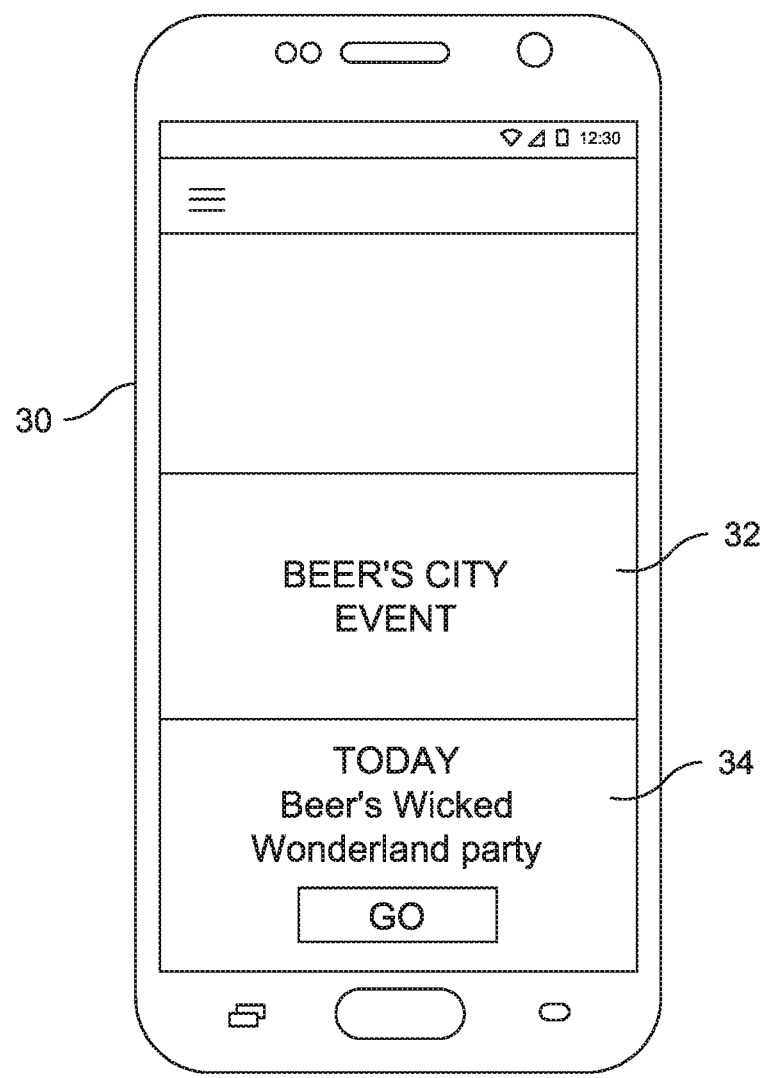
FIG. 5 is a plan view of the device screen displaying an invitation to a social event for loyalty customers.
Figure 6:
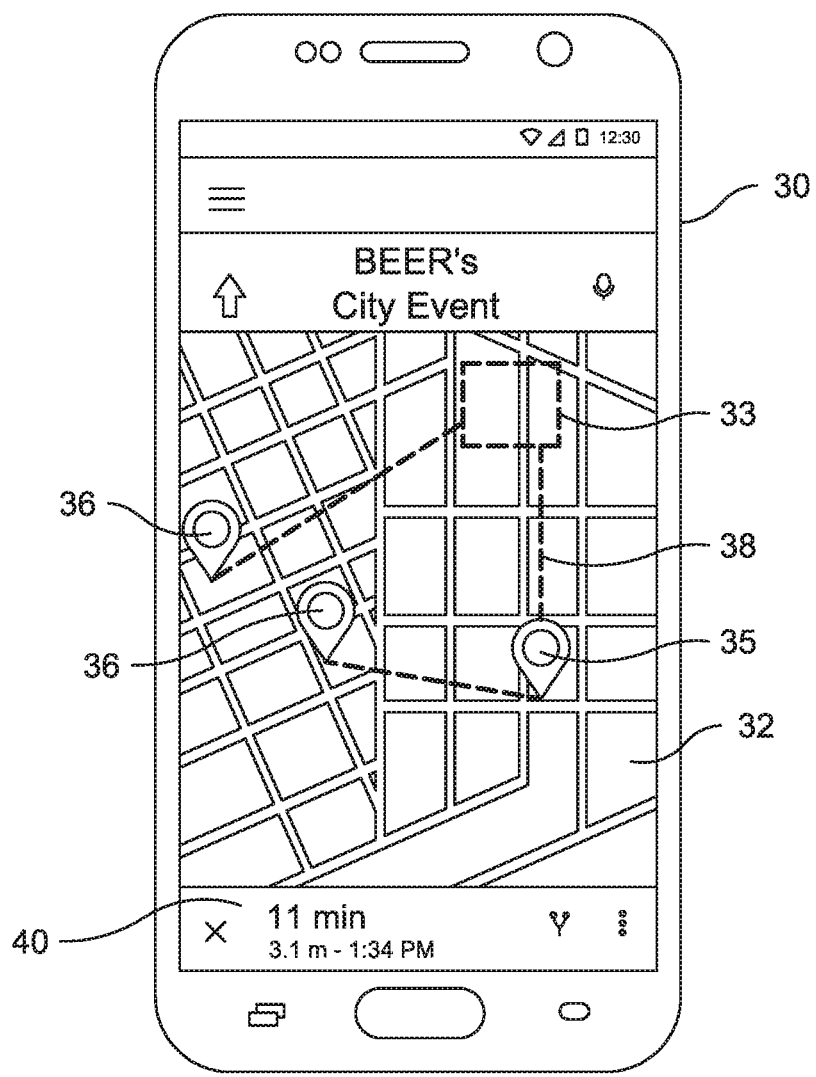
FIG. 6 is a plan view of the device screen providing a map illustration of the event area location, the customer's device location retrieved through GPS, the locations of nearby loyalty customers also invited, directions to the event and the time of the event.

The loyalty purchaser's smartphone screen 32 additionally will display an invitation 34 to a special social event, as illustrated in FIG. 5. Upon acceptance of the invitation, the screen 32 provides a map illustration of the event location 33, the location 37 of the loyalty purchaser's smartphone 30 on the map and the locations 36 of other loyalty customers who will be attending the event. Also displayed is a travel route 38 and the event starting time and travel distance 40, as illustrated in FIG. 6.

Figure 7:
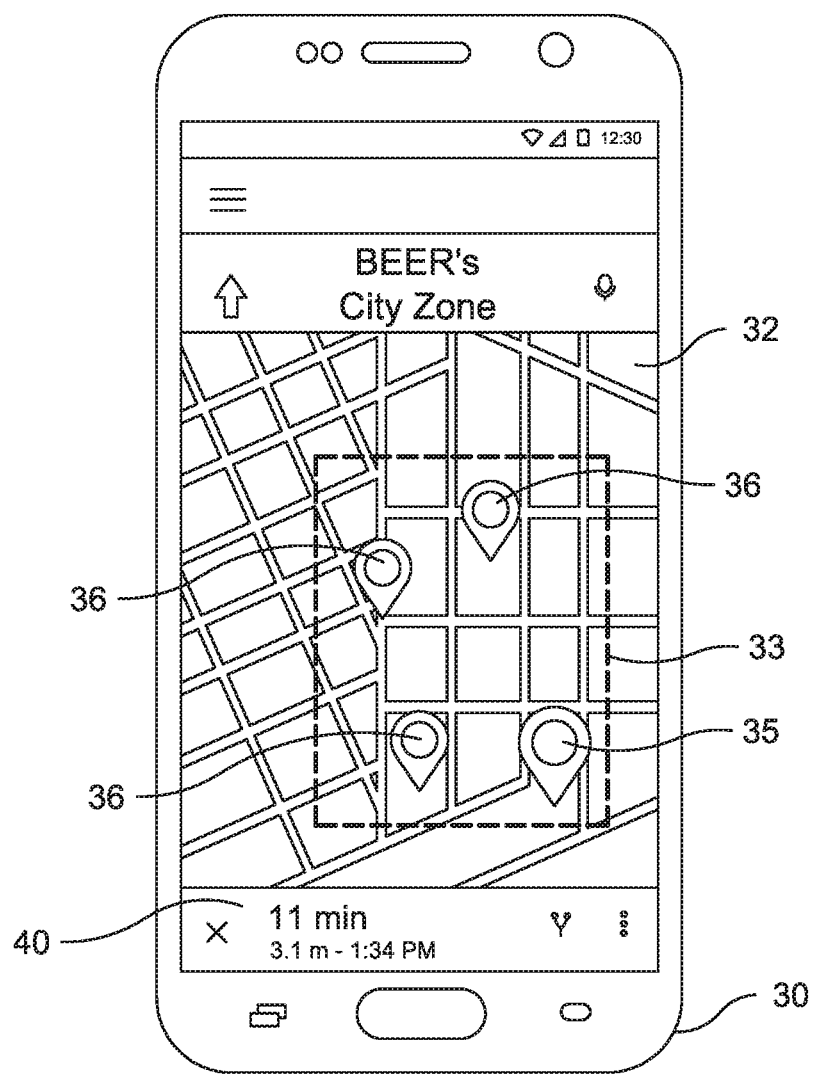
FIG. 7 is a plan view of the screen providing a map illustration of the event area location and the location within the event area of other loyalty customers.

In a subsequent screen display, as illustrated in FIG. 7, the locations of each loyalty customer 35, 36 within the designated event area 33 is displayed and communication links between participants can be established through social media and/or by physical face to face interaction.

Figure 8:
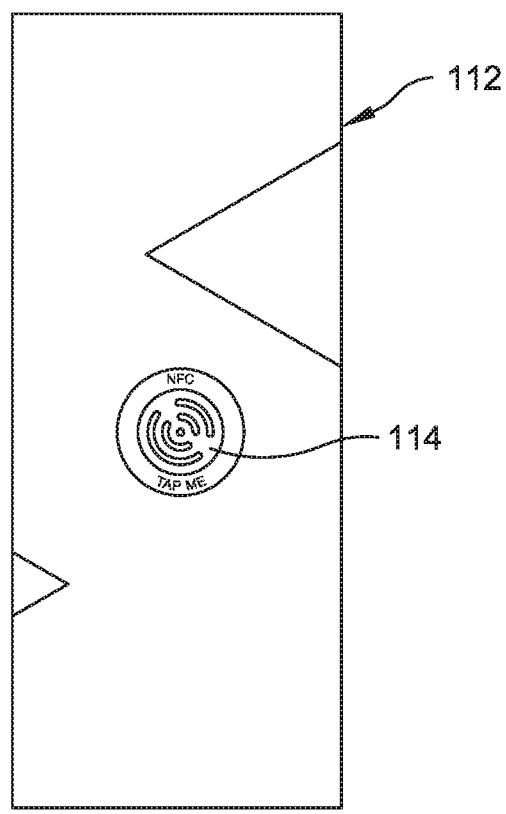
FIG. 8 is a plan view of a product label having an embedded NFC tag in accordance with an alternate embodiment of the invention.
Figure 9:
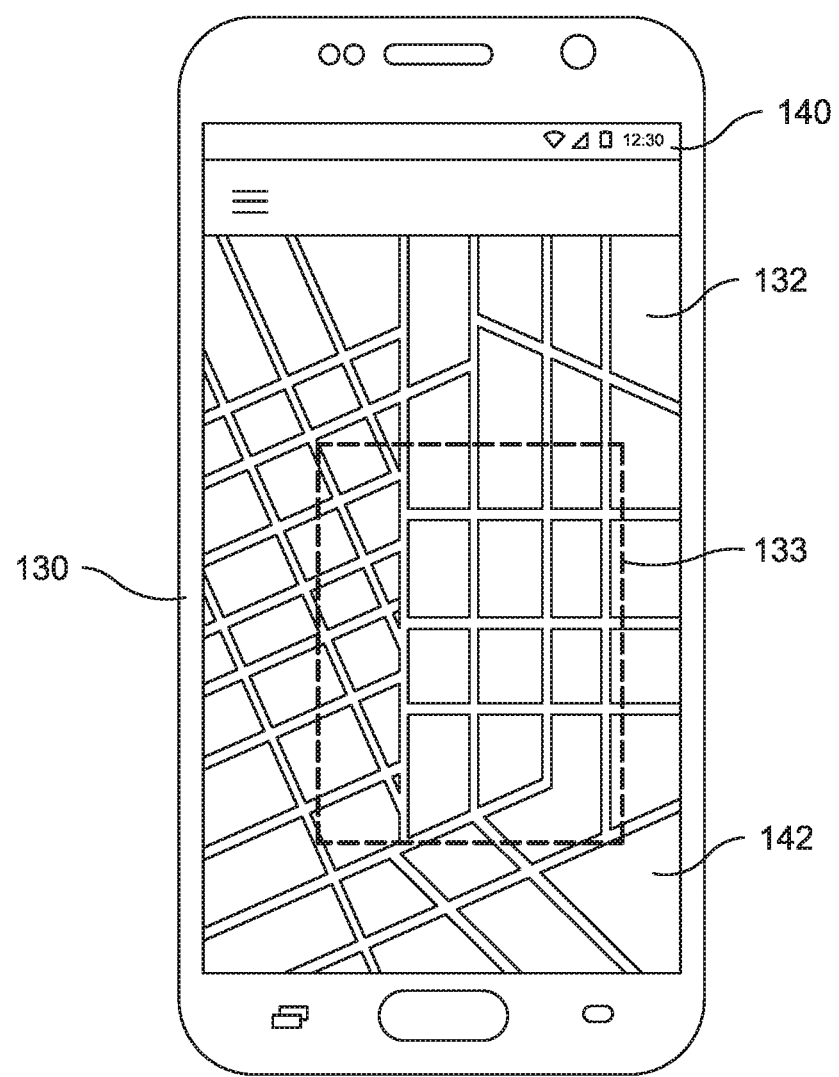
FIG. 9 is a plan view of an alternate NFC tag in accordance with the invention.
Figure 10:
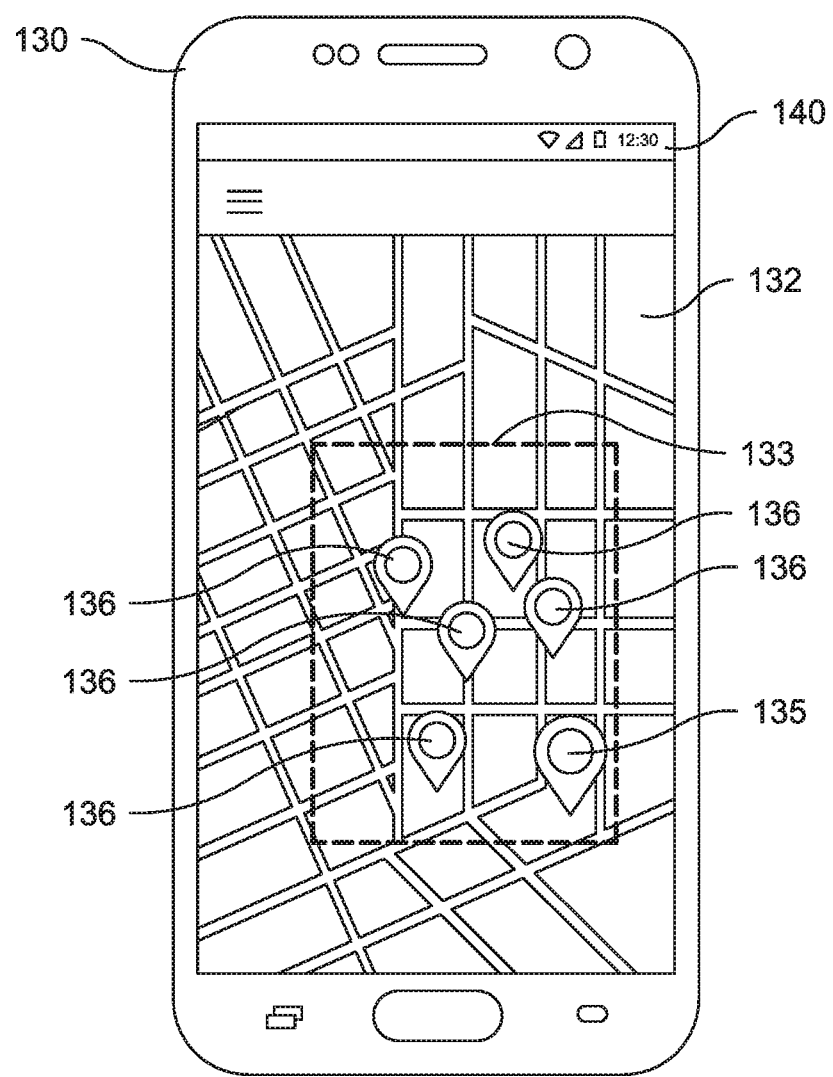
FIG. 10 is a plan view of the NFC enabled device screen displaying a map illustration of an event location wherein the loyalty customer is directed to go, together with the purchased product, in order to obtain proof of purchase and/or loyalty rewards.

As illustrated in FIGS. 8-10, the system may be employed with product labels 112 having NFC tags 114 without loops. When a purchaser accesses the tag 114 on a smartphone 130, the purchaser is directed to a loyalty purchaser designated area 142 and event time 140 appearing on a screen 132. Proof of purchase and incentive rewards, e.g., a lottery, marketing communications, product specific coupons or discount information, will only be available if the purchaser's location 135 is within the designated area 142 at the specified time. In the display appearing on the screen 132 illustrated in FIG. 10, the location of each loyalty customer 135, 136 currently within the designated area is illustrated and participants can communicate through social media and/or by physical face to face interaction.

Thus it will be seen that there is provided a geo-localization purchase incentive system which achieves the various aspects, features and considerations of the present invention and which is well suited for practical use.

All publications and references cited herein are expressly incorporated herein by reference in their entirety.

In the figures of this application, in some instances, a plurality of elements may be shown illustrativeas of a particular element, and a single element may be shown as illustrative of a plurality of a particular elements. Showing a plurality of a particular element is not intended to imply that a system or method implemented in accordance with the invention must comprise more than one of that element or step, nor is it intended by illustrating a single element that the invention is limited to embodiments having only a single one of that respective element. Those skilled in the art will recognize that the numbers of a particular element shown in a drawing can, in at least some instances, be selected to accommodate the particular user needs.

The particular combinations of elements and features in the above-detailed embodiments are exemplary only; the interchanging and substitution of these teachings with other teachings in this and the incoporated-by-reference patents and applications are also expressly contemplated. As those skilled in the art will recognize, variations, modifications, and other implementations of what is described herein can occur to those of ordinary skill in the art without departing from the spirit and the scope of the invention as claimed.

Further, in describing the invention and in illustrating embodiments of the invention in the figures, specific terminology, numbers, dimensions, materials, etc., are used for the sake of clarity. However the invention is not limited to the specific terms, numbers, dimensions, materials, etc. so selected, and each specific term, number, dimension, material, etc., at least includes all technical and functional equivalents that operate in a similar manner to accomplish a similar purpose. Use of a given word, phrase, number, dimension, material, language terminology, product brand, etc. is intended to include all grammatical, literal, scientific, technical, and functional equivalents. The terminology used herein is for the purpose of description and not limitation.

Having described the preferred embodiments of the invention, it will now become apparent to one of ordinary skill in the art that other embodiments incorporating their concepts may be used. Moreover, those of ordinary skill in the art will appreciate that the embodiments of the invention described herein can be modified to accommodate and/or comply with changes and improvements in the applicable technology and standards referred to herein. For example, the technology can be implemented in many other, different, forms, and in many different environments, and the technology disclosed herein can be used in combination with other technologies. Variations, modifications, and other implementations of what is described herein can occur to those of ordinary skill in the art without departing from the spirit and the scope of the invention as claimed. It is felt therefore that these embodiments should not be limited to disclosed embodiments but rather should be limited only by the spirit and scope of the appended claims.

The particular combinations of elements and features in the above-detailed embodiments are exemplary only; the interchanging and substitution of these teachings with other teachings in this and the referenced patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

Having thus described the invention, there is claimed as new and desired to be secured by Letters Patent:

1. A purchase incentive system for a product contained in a package having a closure, the system comprising a label, a portion of the label being affixed to the package remote from the closure, an NFC tag affixed to the label portion, the tag including a programmable RFID circuit, the purchase incentive system further including a frangible circuit loop, the frangible circuit loop extending from the RFID circuit to the closure, the RFID circuit being programmed with a unique identification code corresponding to the product, the system further including one or more NFC smart devices associated with one or more prospective product purchasers, the RFID circuit being programmed to communicate with the one or more NFC smart devices to enable the one or more NFC smart devices to access pre-purchase product specific data, the RFID circuit being programmed to communicate with a NFC smart device of a purchaser of the product, enabling the purchaser's NFC smart device access to purchase incentives comprising post purchase product specific loyalty reward functions in response to the frangible circuit loop being broken when the closure is opened.

2. The purchase incentive system in accordance with claim 1 wherein the incentives include a social event at a specific time and location.

3. The purchase incentive system in accordance with claim 2 wherein the purchaser's NFC smart device includes a display and the reward functions include map images on the display indicating the location of the social event.

4. The purchase incentive system in accordance with claim 3 wherein the purchaser's NFC smart device includes geo-location, functions, the map images indicating the location of the purchaser's NFC smart device.

5. The purchase incentive system in accordance with claim 1 wherein each of the one or more NFC smart devices is associated with each of the one or more purchasers, each of the one or more NFC smart devices having a display displaying post-purchase incentives including map images indicating the location of a social event.

6. The purchase incentive system in accordance with claim 5, the map images further indicating directions for proceeding to the location of the social event.

7. The purchase incentive system in accordance with claim 6, the map images of each NFC smart device indicating the location of the NFC smart device of each purchaser at the social event.

8. The purchase incentive system in accordance with claim 7 the NFC smart device of each purchaser enabling social communication between purchasers at the social event.

9. The purchase incentive system in accordance with claim 1 the label further including a collar extending from the portion of the label affixed to the package remote from the closure to the closure, the collar carrying the frangible circuit loop.

10. The purchase incentive system in accordance with claim 1 wherein the package comprises a bottle and the closure comprises a bottle cap.

11. A purchase incentive system for a product contained in a package, the package having a closure, the system comprising an NFC smart device adapted to be carried by a purchaser of the product, an RFID tag affixed to the package remote from the closure, the tag having a programmable RFID circuit, the system further comprising a frangible circuit loop, the frangible circuit loop extending from the RFID circuit to the closure, the RFID circuit being programmed to communicate with the purchaser's NFC smart device enabling the purchaser's NFC smart device access to incentives comprising loyalty reward functions in response to the frangible circuit loop being broken when the closure is opened.

12. The purchase incentive system in accordance with claim 11 wherein the package comprises a bottle and the closure comprises a bottle cap.

13. The purchase incentive system in accordance with claim 11 wherein the loyalty reward functions include a social event at a specific time and location, the purchaser's smart device includes a display and the reward functions include map images on the display indicating the location of a social event, the smart device includes geo-location functions and the map images indicate the location of the purchaser's smart device.

14. The purchase incentive system in accordance with claim 11 further including a plurality of NFC smart devices associated with a plurality of purchasers, each of the plurality of NFC smart devices having a display and the reward functions further include map images indicating the location of each of the plurality of NFC smart device of each of the plurality of purchasers.

15. The purchase incentive system in accordance with claim 14, wherein each of the plurality of NFC smart devices enabling social communication between the NFC smart devices at the social event.

16. A purchase incentive system for a product contained in a package, the package having a closure, the system comprising a label affixed to the package, a portion of the label being affixed to the package and a further portion of the label being affixed to the closure, the label carrying a programmable RFID circuit, the system further including one or more NFC smart devices associated with one or more prospective purchasers, the RFID circuit being programmed to communicate with the one or more NFC smart devices to enable a said one or more NFC smart devices to access pre-purchase product specific data, the RFID circuit being in communication with the closure and being programmed to remain operative upon opening of the closure, the RFID circuit being programmed to communicate with a purchaser's NFC smart device enabling said purchaser's NFC smart device access to post-purchase incentives in response to the label portions being separated when the closure is opened.

17. The purchase incentive system in accordance with claim 16 wherein the incentives include a social event at a specific time and location, the purchaser's NFC smart device includes a display and the incentives include map images on the display depicting the location of the social event.

18. The purchase incentive system in accordance with claim 16 further including a plurality of NFC smart devices associated with a plurality of purchasers, each of the plurality of NFC smart devices having a display, the reward functions further including map images indicating the location of each of the plurality of NFC smart devices of each of the plurality of purchasers.

19. The purchase incentive system in accordance with claim 17, further including a plurality if RFID circuits associated with a plurality of purchased products having labels, each of the plurality of RFID circuits being programmed to communicate with each of the plurality of NFC smart devices to access incentives when the plurality of NFC smart devices are at the location of the social event.

\* \* \* \* \*